(12) United States Patent
Lagnado et al.

(10) Patent No.: US 12,483,993 B2
(45) Date of Patent: Nov. 25, 2025

(54) TRANSMISSION POWER CONTROL

(71) Applicant: Hewlett-Packard Development Company, L.P., Spring, TX (US)

(72) Inventors: Isaac Lagnado, Spring, TX (US); Yao Cheng Yang, Taipei (TW); Chung-Chun Chen, Taipei (TW); Leo Joseph Gerten, Austin, TX (US); Po Chao Chen, Taipei (TW); Wen Chen Fan, Taipei (TW); Ya-Hsien Wang, Taipei (TW); Elizabeth Lu, Taipei (TW); Steven Harold Petit, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 347 days.

(21) Appl. No.: 18/002,233

(22) PCT Filed: Jul. 24, 2020

(86) PCT No.: PCT/US2020/043552
§ 371 (c)(1),
(2) Date: Dec. 16, 2022

(87) PCT Pub. No.: WO2022/019922
PCT Pub. Date: Jan. 27, 2022

(65) Prior Publication Data
US 2023/0232336 A1    Jul. 20, 2023

(51) Int. Cl.
*H04W 52/22*    (2009.01)
*H04W 52/28*    (2009.01)
*H04W 52/36*    (2009.01)

(52) U.S. Cl.
CPC ........ *H04W 52/225* (2013.01); *H04W 52/28* (2013.01); *H04W 52/367* (2013.01)

(58) Field of Classification Search
CPC .. H04W 52/225; H04W 52/28; H04W 52/367
See application file for complete search history.

(56) References Cited

U.S. PATENT DOCUMENTS

| | | |
|---|---|---|
| 8,665,779 B2 | 3/2014 | Burgan et al. |
| 8,831,528 B2 | 9/2014 | Shi |
| 9,414,330 B2 | 8/2016 | Lagnado |
| 9,853,750 B2 | 12/2017 | Lagnado et al. |
| 10,484,075 B1 | 11/2019 | Maheshwari et al. |

(Continued)

FOREIGN PATENT DOCUMENTS

EP    2786501 B1    5/2018

*Primary Examiner* — Asad M Nawaz
*Assistant Examiner* — Hugh Mark Ashley
(74) *Attorney, Agent, or Firm* — Quarles & Brady LLP

(57) ABSTRACT

In some examples, an electronic device comprises a wireless transceiver to transmit a packet and a processor coupled to the wireless transceiver. The processor is to update a running average of a radiation level over a time period. The running average is based on a quantity of packets transmitted by the wireless transceiver during the time period and a radiation level associated with the quantity of packets. The processor is to determine whether the running average exceeds a threshold and to control transmission power for the packet based on the determination and based on a destination of the packet.

20 Claims, 6 Drawing Sheets

(56) References Cited

U.S. PATENT DOCUMENTS

| | | | |
|---|---|---|---|
| 2003/0048761 A1* | 3/2003 | Jarett | H04W 52/54 |
| | | | 370/312 |
| 2007/0111681 A1 | 5/2007 | Alberth et al. | |
| 2008/0129615 A1 | 6/2008 | Breit et al. | |
| 2012/0147801 A1 | 6/2012 | Ho et al. | |
| 2013/0169348 A1 | 7/2013 | Shi | |
| 2014/0146723 A1* | 5/2014 | Chang | H04W 52/0206 |
| | | | 370/311 |
| 2014/0248892 A1 | 9/2014 | Wilson et al. | |
| 2014/0362723 A1* | 12/2014 | Garg | H04W 52/267 |
| | | | 370/253 |
| 2014/0370929 A1 | 12/2014 | Khawand et al. | |
| 2015/0031408 A1* | 1/2015 | Kalla | H04W 52/367 |
| | | | 455/522 |
| 2017/0064641 A1* | 3/2017 | Logan | H04W 52/367 |
| 2018/0076844 A1 | 3/2018 | Park et al. | |
| 2018/0167897 A1* | 6/2018 | Sampath | H04W 52/367 |

* cited by examiner

TRANSMISSION POWER CONTROL

BACKGROUND

Excess energy radiation can harm living things. Accordingly, the energy radiated by electronic devices operating in close proximity to a human body should not exceed specified limits. Electronic devices that are able to transmit or receive radio frequency (RF) signals are subject to government regulations prescribing energy radiation limits. To satisfy the regulations, an electronic device (e.g., notebooks, laptops, tablets, smartphones, wearable electronic devices, or other mobile devices able to transmit or receive RF signals) may monitor transmissions of packets to determine whether an energy (e.g., radiation level) emitted by the electronic device exceeds a limit. In response to the radiation level exceeding the limit, the electronic device may reduce an average transmission power to reduce the radiation level.

BRIEF DESCRIPTION OF THE DRAWINGS

Various examples are described below referring to the following figures.

DETAILED DESCRIPTION

Figure 1:
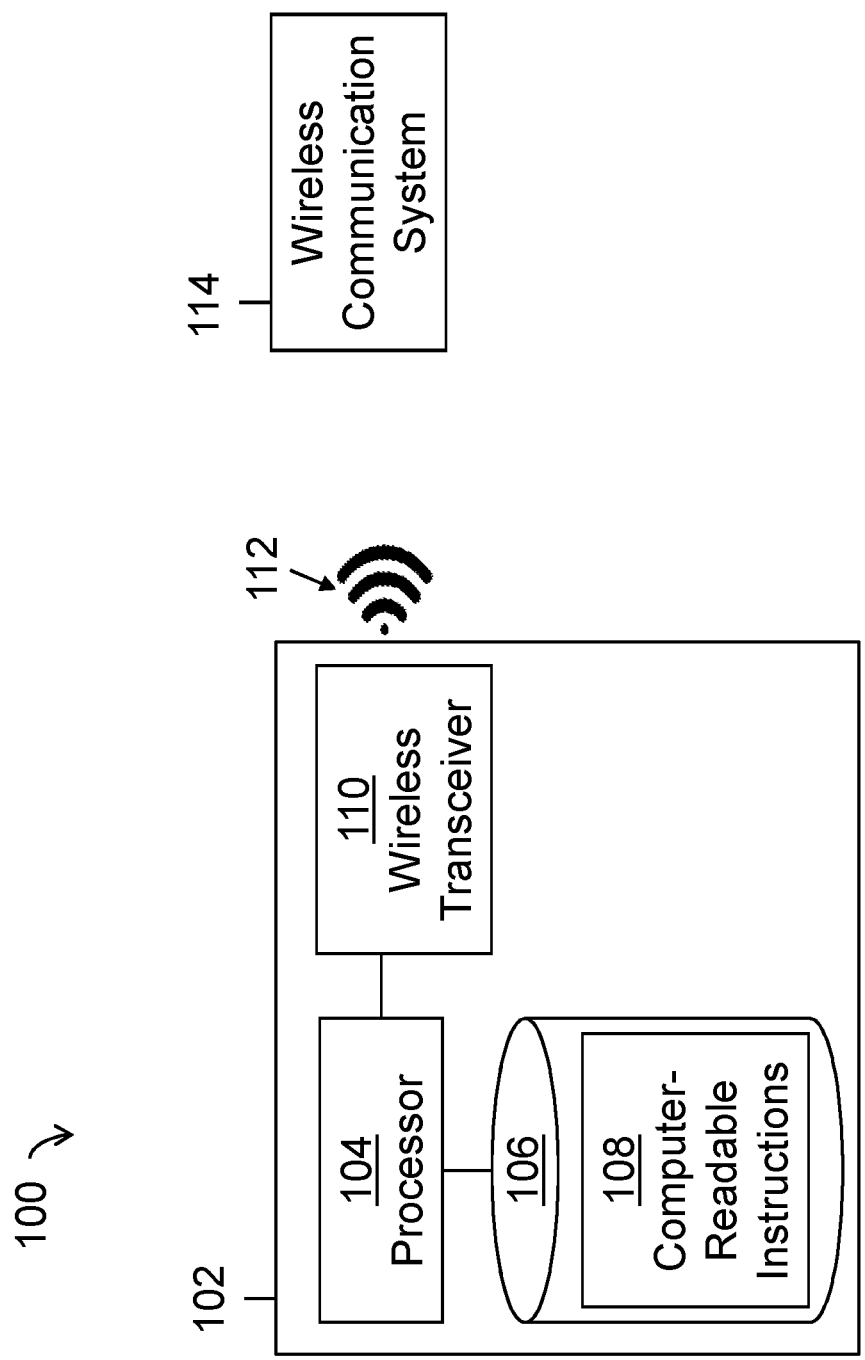
FIG. 1 depicts a schematic diagram of a system comprising an electronic device capable of controlling transmission power, in accordance with various examples.

As mentioned above, government regulations set limits on radiation levels that electronic devices may emit. For example, a specific absorption rate (SAR) is a rate at which energy is absorbed by a human body per unit mass (watts/kilogram (W/kg)), and a regulation may specify a maximum SAR for an electronic device. To determine whether a radiation level emitted by an electronic device exceeds the limit, the electronic device may measure parameters wireless transceiver while the wireless transceiver transmits packets. Measured parameters may include a maximum power output of the wireless transceiver, an actual power output (e.g., the power output over a period of time) of the wireless transceiver, and/or an estimated power output based on a received signal strength indicator (RSSI). The electronic device may utilize the measurements to calculate, or estimate, a radiation level. In response to the radiation level exceeding the threshold, the electronic device may control the transmissions to reduce the radiation level emitted by the electronic device. For example, the electronic device may reduce a transmission power to reduce the radiation level. However, a uniform reduction of the transmission power may result in reduced communications performance and diminished user satisfaction.

This disclosure describes an electronic device that uses a time averaged SAR calculation in conjunction with a priority of a packet to ensure a radiation level of the electronic device remains below a target limit, for example, a limit prescribed by the government. The time averaged SAR calculation is a measurement of a radiation exposure of a user of the electronic device over a time period. More specifically, the time averaged SAR calculation is a running average of a radiation level that is based on a quantity of packets transmitted by the wireless transceiver during a time period and based on radiation levels associated with the quantity of packets. The time period may be any suitable duration of time. For example, the time period may match a duration of time associated with SAR measurements (e.g., six minutes). In another example, the time period may match a duration of time to transmit a number of related packets. In other examples, other durations of time may be used.

In response to the running average exceeding a first threshold (e.g., a product of the target limit multiplied by a multiplier), the electronic device reduces a transmission power for a packet based on a priority of the packet. The packet is a signal comprising data that is organized in a specific, predetermined manner. The data may include an identifier of the electronic device that transmitted the packet, an identifier of an intended recipient of the packet, data (e.g., a payload) to be transferred between the electronic device and the intended recipient, a number of related packets to be transferred, a size of the packet, an identifier of the packet, an identifier of the related packets, or some combination thereof, for example. As used herein, related packets are a number of packets to transmit a type of information. The type of information may be related to an application (e.g., set of related computer-readable instructions for performing a task) installed on the electronic device. For instance, the application may be an email application, a web browser, or a video streaming service. The priority of the packet may be based on a physical layer specification, an Internet Protocol (IP) layer specification, an application layer specification, a user-defined specification, or some combination thereof.

A physical layer of a packet may indicate whether a packet is a management packet that maintains a network connection or a data packet that is to traverse the network connection toward a destination device. In some examples, the physical layer specification may assign a management packet a higher priority than a data packet. In other examples, the physical layer specification may prioritize a data packet ahead of a management packet.

An Internet Protocol (IP) layer of a packet may include an IP address that indicates an origin of the packet, an IP address that indicates a destination of the packet, or some combination thereof. In some examples, the IP layer specification may assign a packet having a first destination a higher priority than a packet having a second destination. For example, the IP layer specification may assign a packet having a destination that matches an IP address associated with a local area network (LAN) a higher priority than a packet having a destination that matches an IP address associated with a wide area network (WAN). The LAN may be a network comprising connected devices within a location (e.g., building, campus), for example. The WAN may be the Internet or a private network associated with an organization (e.g., business entity, school entity), for example.

An application layer of a packet may associate the packet with an application installed on the electronic device. In various examples, the application layer specification may assign a packet associated with a first application a higher priority than a packet associated with a second application.

In other examples, the application layer specification may assign a packet associated with a third application a higher priority than the packet associated with the first application and ahead of the packet associated with the second application.

A user-defined specification may associate a packet with a priority based on user preferences. The user preferences may be installed at manufacture, determined by a user having a security access to the electronic device, determined by a user having access to the electronic device, or some combination thereof. The user preferences may be based on a quality of service preference. The quality of service preference may be assigned based on which applications the user utilizes most often, based on which applications utilize the most resources of the electronic device, or some other user-defined preference. For example, a user may assign a video streaming application a higher priority than an email application. In another example, a user may assign a word processing application a higher priority than an email application.

In some examples, in response to the running average exceeding a second threshold (e.g., a product of the target limit multiplied by another multiplier of the target limit), the electronic device reduces the transmission power regardless of the priority of a packet. In other examples, in response to the running average falling below a third threshold (e.g., a product of the target limit multiplied by yet another multiplier), the electronic device may increase the transmission power based on a priority of the packet. In some examples, a value of the third threshold may match a value of the first threshold. In other examples, a value of the third threshold may be between a value of the first threshold and a value of the second threshold. In yet other examples, a value of the third threshold may be higher than the values of the first and the second thresholds. Reducing or increasing a transmission power may be accomplished by reducing or increasing a power level of the wireless transceiver or by adding or removing a delay time before transmission of the packet, for example. By utilizing a time averaged SAR calculation in conjunction with a priority of a packet, the electronic device may perform real-time control of radiation levels and optimize communications performance to enhance user satisfaction.

In one example in accordance with the present disclosure, an electronic device capable of controlling transmission power is provided. The electronic device comprises a wireless transceiver to transmit a packet and a processor coupled to the wireless transceiver. The processor updates a running average of a radiation level over a time period. The running average is based on a quantity of packets transmitted by the wireless transceiver during the time period and based on radiation levels associated with the quantity of packets. The processor determines whether the running average exceeds a threshold and controls transmission power for the packet based on the determination and based on a destination of the packet.

In another example in accordance with the present disclosure, an electronic device capable of controlling transmission power is provided. The electronic device comprises a wireless transceiver to transmit a packet and a processor coupled to the wireless transceiver. The processor updates a running average of a radiation level over a time period. The running average is based on a quantity of packets transmitted during the time period and based on radiation levels associated with the quantity of packets. The processor sets transmission power for the packet to a first power level when the running average exceeds a first threshold and to a second power level when the running average exceeds a second threshold, where the second power level is based on a physical layer of the packet.

In yet another example in accordance with the present disclosure, a method for controlling transmission power is provided. The method, when executed by a processor of an electronic device, causes the processor to update a running average of a radiation level over a time period. The running average is based on a quantity of packets transmitted during the time period and based on radiation levels associated with the quantity of packets. The method causes the process to determine whether the running average exceeds a threshold and to control transmission power for a packet based on the determination and based on a priority associated with a physical layer of the packet.

Referring now to FIG. 1, a schematic diagram of a system 100 comprising an electronic device 102 capable of controlling transmission power is depicted, in accordance with various examples. The system 100 comprises the electronic device 102 and a wireless communication system 114. The electronic device 102 may be a notebook, laptop, tablet, smartphone, wearable electronic device, or other mobile device able to transmit or receive RF signals, for example. The wireless communication system 114 may be a network system for a signal 112 to traverse toward a destination IP address or may be the network system comprising the destination IP address. The destination IP address may belong to another electronic device or an electronic device coupled to a LAN or WAN via a cable, for example. Such an electronic device may be a docking station, a modem, a router, or a printing device, for example. The signal 112 is communicated between the electronic device 102 and the wireless communication system 114. The signal 112 may be a packet transmitted from the electronic device 102 to the wireless communication system 114, for example. In another example, the signal 112 may be a signal received by the electronic device 102 from the wireless communication system 114.

In various examples, the electronic device 102 comprises a wireless transceiver 110, a storage device 106, and a processor 104 coupled to the wireless transceiver 110 and to the storage device 106. The wireless transceiver 110 transmits and receives signals. The wireless transceiver 110 may transmit or receive the signal 112, for example. The storage device 106 may include a hard drive, solid state drive (SSD), flash memory, random access memory (RAM), or other suitable memory, for example. The processor 104 may be a microprocessor, a microcomputer, a microcontroller, a programmable integrated circuit, a programmable gate array, or another suitable controller, for example. In some examples, the storage device 106 may store computer-readable instructions 108. The computer-readable instructions 108, when executed by the processor 104, may cause the processor 104 to perform some or all of the actions attributed herein to the processor 104.

In various examples, and as described above, the processor 104 calculates a time averaged SAR to ensure that a radiation level of the electronic device 102 remains below a target limit, such as a government-prescribed limit. The processor 104 monitors for a packet that is to be transmitted. For example, the processor 104 may receive an indication from an application that an email message is to be sent. In another example, the processor 104 may monitor the wireless transceiver 110 for a transmission. In response to a determination that a packet is to be transmitted, the processor 104 may take a measurement of the wireless transceiver 110. As described above, the aforementioned parameter measurements of the wireless transceiver may include a maximum power output, an actual power output, an estimated power output based on a received signal strength indicator (RSSI), or a combination thereof, for example. The maximum power output is a maximum power output of the wireless transceiver. The actual power output is a measured power output during a duration of time. The duration of time may match a duration of time for a packet transmission, for example. In another example, the duration of time may match a duration of time for the transmission of a number of related packets. In yet another example, the duration of time may be any predefined time period. The RSSI represents a power level of a packet received by the transceiver. In an example, to determine the estimated power output, the RSSI may be compared to a data structure that maps the RSSI to a corresponding power output of the wireless transceiver. As used herein, a data structure is an object that stores data for cross-referencing (e.g., linked list, lookup table, database).

In some examples, the processor 104 may utilize the measurement to calculate a time averaged SAR. As described above, the running average of the radiation level is based on a number of packets transmitted by the wireless transceiver 110 during a time period and on radiation levels associated with the number of packets. For example, the processor 104 may sum the measurement with a number of previous measurements to obtain a first result. The number of previous measurements may match a number of previous transmissions during the time period, in various examples. As described above, the time period may be any duration of time. For example, in response to the time period being six minutes, the processor 104 may sum the measurement with previous measurements associated with transmissions occurring during the previous six minutes. The processor 104 may add one to the number of previous measurements to obtain a second result. The processor 104 may divide the first result by the second result to obtain the running average.

In response to the time averaged SAR exceeding a threshold, the processor 104 may control a transmission power of the wireless transceiver 110 to reduce the radiation level emitted by the electronic device 102. As described above, the threshold may be determined by calculating a product of the target limit multiplied by a multiplier. To control the transmission power, the processor 104 may cause electronic components of the electronic device 102 to perform any suitable analog or digital logic operations that result in a reduction of transmission power. The electronic components may be part of or coupled to the wireless transceiver 110, for example. The electronic components may include electronic hardware in the form of integrated circuits, in some examples. In various examples, the integrated circuits may include both hardware and computer-readable instructions.

By controlling the transmission power based on a time averaged SAR exceeding a threshold, the processor 104 may reduce a radiation level to which a user is exposed without relying on a proximity sensor to detect a presence of the user. Controlling the transmission power may include setting the transmission power to a higher power level, setting the transmission power to a lower power level, adding a delay time before transmission of the packet, removing a delay time before transmission of the packet, or some combination thereof. In some examples, controlling the transmission power may include determining that the transmission power should remain at a current level. Instead of relying on a proximity sensor, the presence of the user may be assumed based on a number of packets being transmitted, for example. In some examples, control of the transmission power may be triggered when the number of packets being transmitted exceeds a predetermined level. For example, in response to the electronic device 102 transmitting data more than 25% of a predefined duration of time, control of the transmission power may be triggered. In another example, control of the transmission power may be triggered in response to the electronic device 102 exiting a low-power state (e.g., sleep, power off).

Figure 2:
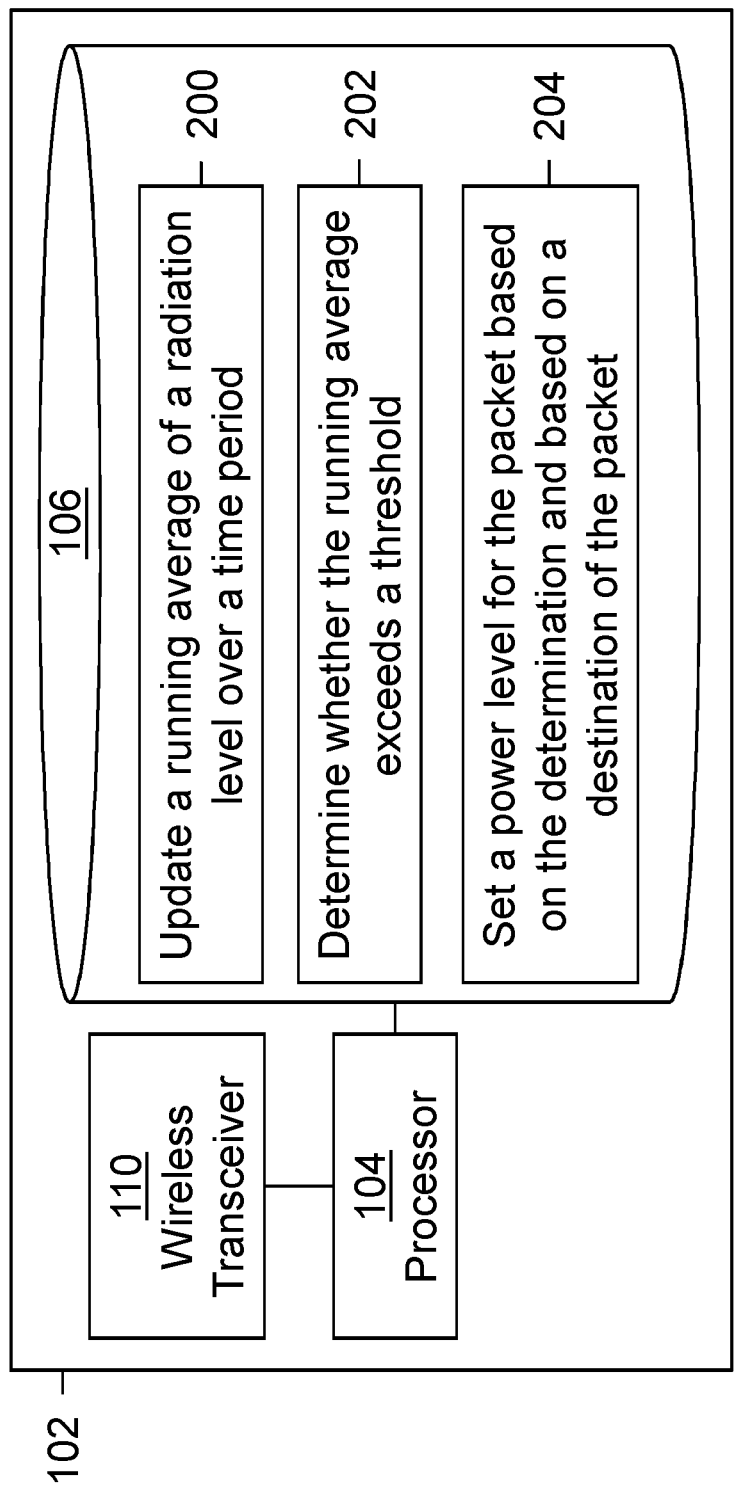
FIG. 2 depicts a schematic diagram of an electronic device for controlling transmission power in accordance with various examples.

Referring now to FIG. 2, a schematic diagram of the electronic device 102 for controlling transmission power is depicted, in accordance with various examples. As described above with respect to FIG. 1, the electronic device 102 comprises the wireless transceiver 110, the storage device 106, and the processor 104 coupled to the wireless transceiver 110 and to the storage device 106. The storage device 106 may store computer-readable instructions 200, 202, and 204. The computer-readable instructions 200, 202, 204 may be the computer-readable instructions 108, for example.

In various examples, when executed by the processor 104, the computer-readable instructions 200, 202, 204 cause the electronic device 102 to control transmission power. For example, execution of the computer-readable instruction 200 may cause the processor 104 to update a running average of a radiation level over a time period. The time period may be referred to herein as a first time period. As described above with respect to FIG. 1, the running average is based on a quantity of packets transmitted by the wireless transceiver 110 during the time period and on radiation levels associated with the quantity of packets. Execution of the computer-readable instruction 202 may cause the processor 104 to determine whether the running average exceeds a threshold. The threshold may be referred to as a first threshold. Execution of the computer-readable instruction 204 may cause the processor 104 to control transmission power for the packet based on the determination and based on a destination of the packet. The packet may be referred to as a first packet. In various examples, the processor 104 may set the transmission power to a higher power level or a lower power level based on the determination and based on the destination of the packet.

As described above, the destination of the packet may be determined by an IP layer associated with the packet. In various examples, the processor 104 controls transmission power for the packet based on a priority associated with the destination of the packet. As described above, an IP layer specification may assign a packet having a first IP destination a higher priority than a packet having a second IP destination. For example, the IP layer specification may assign a higher priority to a packet having an IP destination that matches an IP address of a computing device associated with a LAN and a lower priority to a packet having an IP destination that matches an IP address associated with a WAN. In another example, the IP layer specification may assign a higher priority to a packet having an IP destination associated with a first domain of a WAN and a lower priority to a packet having an IP destination associated with a second domain of the WAN. In yet another example, the IP layer specification may assign a higher priority to a packet having an IP destination associated with a domain of a first WAN and a lower priority to a packet having an IP destination associated with a domain of a second WAN.

An IP layer specification may be implemented as a data structure (not expressly shown) stored on the storage device 106, in some examples. The data structure of the IP layer specification may include destinations and associated priorities, for example. The processor 104 may compare the destination of the packet to data of the data structure to determine a priority of the packet in various examples. In response to the processor 104 determining that the priority of the packet falls below a priority level, the processor 104 may reduce the transmission power. The priority level may be any predetermined value. For example, priorities may be defined as "high," "medium," and "low," and the priority level may equal "medium." In response to the processor 104 determining that a priority of the packet is "low," the processor 104 may reduce the transmission power. In another example, priorities may be defined using numerical values where "1" is a high value and "5" is a low value, and the priority level may equal "2." In response to the processor 104 determining that the priority of the packet is "3," the processor 104 may reduce the transmission power.

In some examples, in response to the processor 104 determining that the priority of the packet matches or exceeds a priority level, the processor 104 may increase the transmission power. In other examples, in response to the processor 104 determining that the priority of the packet matches or exceeds a priority level and determining that the running average has not exceeded the threshold for a predetermined length of time, the processor 104 may increase the transmission power. In an example, a priority of "1" is a high value and "5" is a low value, the priority level equals "2," and a predetermined length of time equals twenty minutes. In response to the processor 104 determining that the priority of the packet is "1" and determining that the running average has not exceeded the threshold for twenty-one minutes, the processor 104 may increase the transmission power.

In further examples, the processor 104 may determine a physical layer of the packet to determine a power level to which to set the transmission power. As described above, the physical layer of a packet may indicate whether a packet is a management packet that maintains a network connection or a data packet that is to traverse the network connection toward a destination device. In an example, in response to the processor 104 determining that the destination of the packet matches an IP address of a LAN and that the physical layer of the packet indicates a management packet, the processor 104 may set the transmission power to a maximum power output. In response to the processor 104 determining that the destination of the packet matches an IP address of a WAN and determining that the physical layer of the packet indicates a data packet, the processor 104 may set the transmission power to a lower power level based on the destination of the packet matching a destination of an IP address of the WAN. In response to the processor 104 determining that the physical layer of the packet indicates a data packet, the processor 104 may set the transmission power to another lower power level based on the destination of the packet matching a destination of an IP address associated with the Internet.

In various examples, a data structure (not expressly depicted) comprising priorities and associated transmission powers may be stored on the storage device 106. As described above, the priorities may be based on a physical layer specification, an IP layer specification, an application layer specification, a user-defined specification, or some combination thereof. In response to the processor 104 determining a priority of the packet, the processor 104 may set the transmission power based on the associated transmission power in the data structure. In some examples, priorities may have multiple associated transmission powers. Each transmission power of the multiple transmission powers may be associated with a different threshold, for example. For example, a priority may have a first transmission power associated with a first threshold, a second transmission power associated with a second threshold, a third transmission power associated with a third threshold, etc. In response to the processor 104 determining a priority of the packet and determining which threshold has been crossed, the processor 104 may set the transmission power based on the associated transmission power in the data structure.

In further examples, the processor 104 may update the running average over a second time period. In some examples, the processor 104 may make a second determination as to whether the running average, updated over the second time period, exceeds a second threshold. The processor 104 may control transmission power for a second packet based on the second determination. In various examples, a value of the second threshold may be less than a value of the first threshold. For example, if the electronic device 102 is not to exceed a target limit associated with 8 decibel-milliwatts (dBm), the first threshold may equal 10 dBm and the second threshold may equal 8 dBm. In response to the running average of the first time period exceeding the 10 dBm first threshold, the processor 104 may set a transmission power based on a destination of the first packet. For example, the processor 104 may set the transmission power to a maximum power output of 14 dBm based on the destination of the first packet matching an IP address associated with a LAN. In another example, the processor 104 may set the transmission power to 12 dBm based on the destination of the first packet matching an IP address associated with a WAN. In response to a running average of a second time period exceeding the 8 dBm second threshold, the processor 104 may set the transmission power for a second packet to 8 dBm, for example.

In other examples, the processor 104 may make a second determination as to whether the running average, updated over the second time period, is below the threshold. The processor 104 may control transmission power for a second packet based on the second determination. For example, if the electronic device 102 is not to exceed a target limit associated with 10 dBm, the threshold may equal 10 dBm. In response to a running average of a first time period exceeding the 10 dBm threshold, the processor 104 may set a transmission power based on a destination of the first packet. In an example, the processor 104 may set the transmission power to a maximum power output of 12 dBm based on the destination of the first packet matching an IP address of a LAN. In another example, the processor 104 may set the transmission power to 10 dBm based on the destination of the first packet matching an IP address of the Internet. In response to a running average of a second time period not exceeding the 10 dBm threshold, the processor 104 may set the transmission power for a second packet to the maximum power output of 12 dBm.

In yet other examples, the processor 104 may make a second determination as to whether the running average, updated over the second time period, exceeds the threshold. The processor 104 may control transmission power for a second packet based on the second determination and based on a destination of the second packet in instances where the destination of the second packet differs from the destination of the first packet. For example, if the electronic device 102 is not to exceed a target limit associated with 8 dBm, the threshold may equal 8 dBm. In response to a running average of a first time period exceeding the 8 dBm threshold, the processor 104 may set a transmission power based on a destination of the first packet. In an example, in response to the destination of the first packet matching an IP address of a computing device of a LAN, the processor 104 may set the transmission power to a maximum power output of 12 dBm.

In response to a running average of a second time period exceeding the 8 dBm threshold and a destination of the second packet matching an IP address of the Internet, the processor 104 may set the transmission power for a second packet to a power output of 7 dBm.

Figure 3:
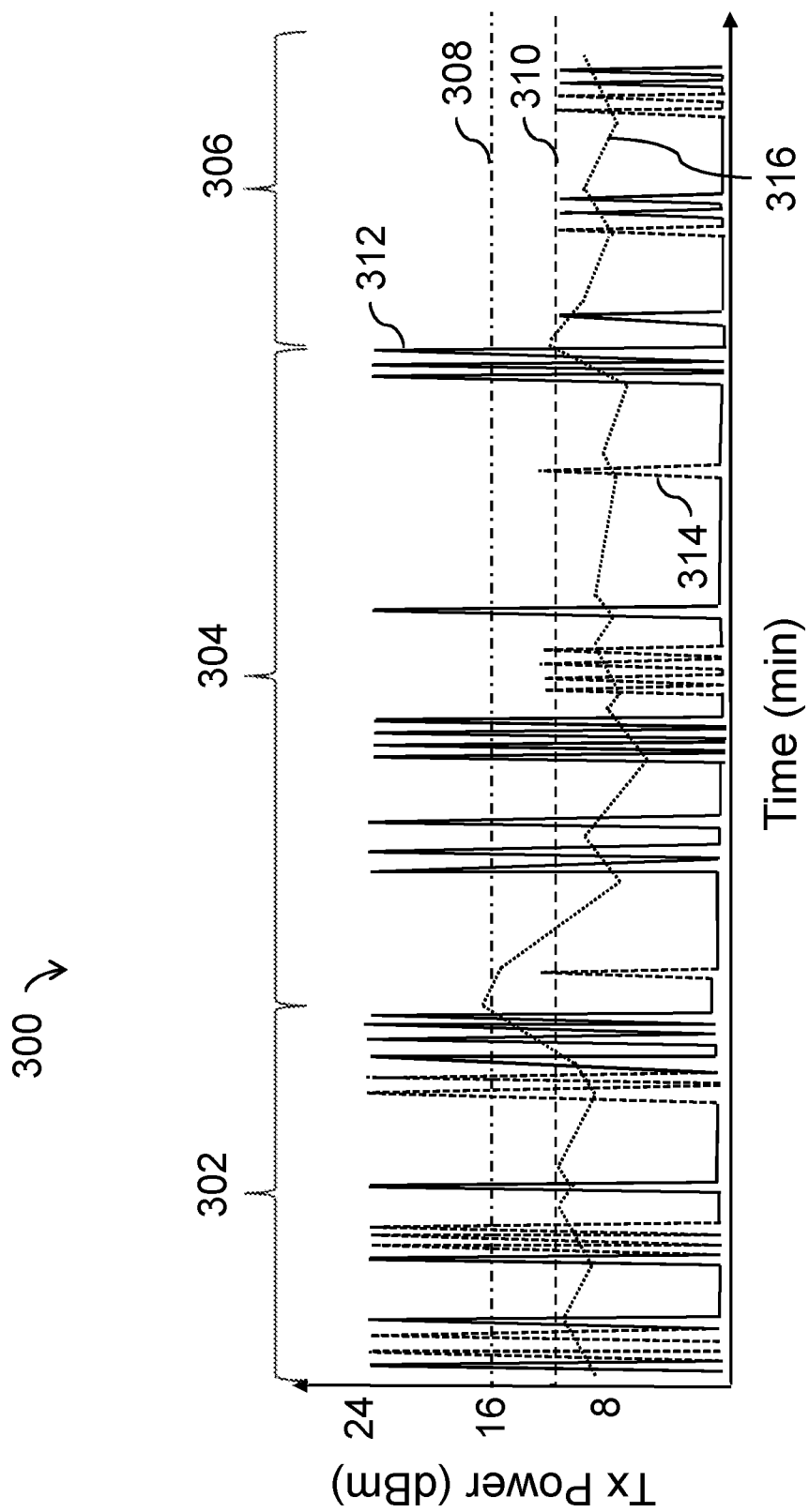
FIG. 3 is a timing diagram depicting the control of transmission power by an electronic device in accordance with various examples.

Referring now to FIG. 3, a timing diagram 300 depicting the control of transmission power by an electronic device is presented, in accordance with various examples. The electronic device may be the electronic device 102, for example. An x-axis of the timing diagram 300 is a time in minutes (min). A y-axis of the timing diagram 300 is a transmission (TX) power in decibel-milliwatts (dBm). A line 308 may represent a first threshold. A line 310 may represent a second threshold. A waveform 312 may represent a waveform of a first packet type having a first physical layer, a first IP layer, a first application layer, or some combination thereof. For example, the waveform 312 may be the waveform of a packet having a physical layer associated with a management packet. A waveform 314 may represent a waveform of a second packet type having a second physical layer, a second IP layer, a second application layer, or some combination thereof. For example, the waveform 314 may be the waveform of a packet having a physical layer associated with a data packet. A waveform 316 may represent a running average of a measurement of the wireless transceiver. The wireless transceiver may be the wireless transceiver 110, for example.

Referring to the lines 308, 310 and the waveforms 312, 314, 316 of FIG. 3 along with FIG. 2, in operation, during a first time period 302, the processor 104 may determine that a running average is below the first threshold, as indicated by the waveform 316 having lower values than values of line 308. In response to the running average being below the first threshold, the processor 104 may control the transmission power by allowing the power level to remain the same for all packets, as indicated by the peaks of the waveform 312 and the peaks of the waveform 314 having values of approximately 24 dBm.

At a boundary of the first time period 302 and a second time period 304, the waveform 316 rises above the line 308. In response to the waveform 316 of the running average exceeding the line 308 of the first threshold, the processor 104 reduces the transmission power for the second packet type, as indicated by the peaks of the waveform 314 having values of approximately 12 dBm. Reducing the transmission power for the second packet type decreases the running average so that it is below the first threshold. At a boundary of the second time period 304 and a third time period 306, the waveform 316 rises above the line 310. In response to the waveform 316 of the running average exceeding the line 310 of the second threshold, the processor 104 reduces the transmission power for the first and the second packet types, as indicated by the peaks of the waveforms 312, 314 having values of approximately 10 dBm. Reducing the transmission power for the first and the second packet types decreases the running average so that it is below the second threshold.

Figure 4:
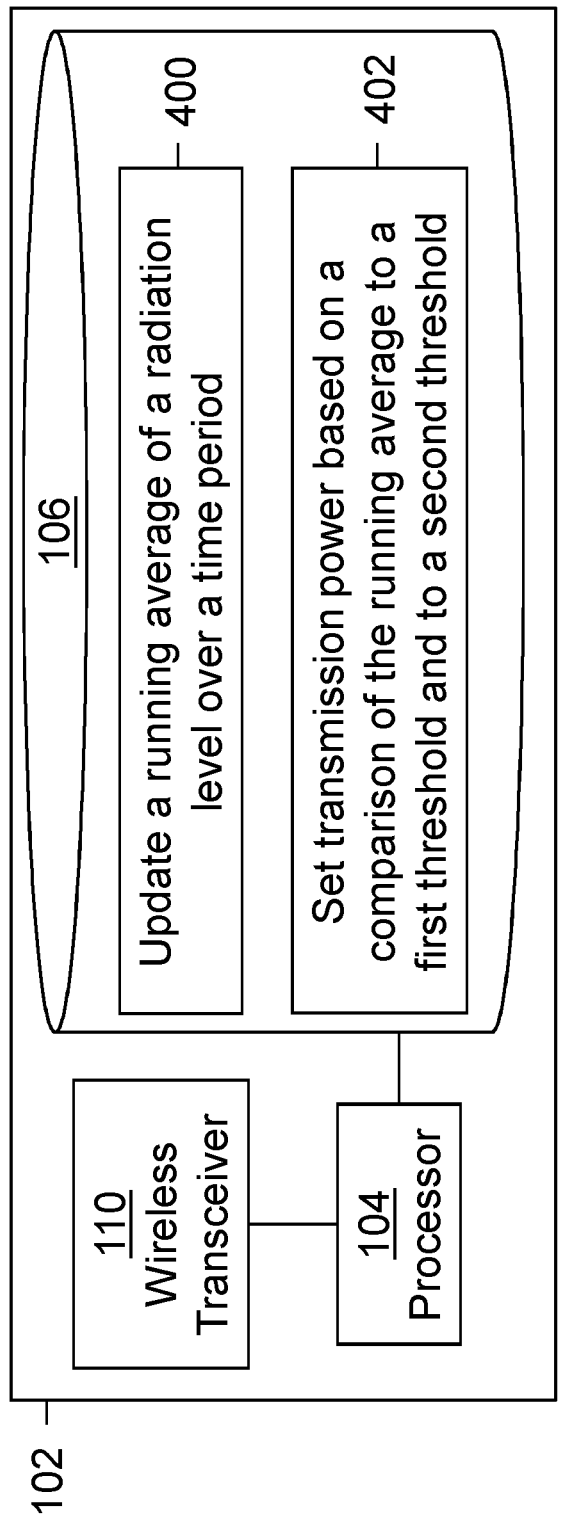
FIG. 4 depicts a schematic diagram of an electronic device for controlling transmission power in accordance with various examples.

Referring now to FIG. 4, a schematic diagram of the electronic device 102 for controlling transmission power is presented, in accordance with various examples. As described above with respect to FIGS. 1 and 2, the electronic device 102 comprises the wireless transceiver 110, the storage device 106, and the processor 104 coupled to the wireless transceiver 110 and to the storage device 106. The storage device 106 may store computer-readable instructions 400 and 402. The computer-readable instructions 400, 402 may be the computer-readable instructions 108, for example.

In various examples, when executed by the processor 104, the computer-readable instructions 400, 402 cause the processor 104 to control transmission power. For example, execution of the computer-readable instruction 400 may cause the processor 104 to update a running average of a radiation level over a time period. The time period may be referred to herein as a first time period. Execution of the computer-readable instruction 402 may cause the processor 104 to set transmission power for the packet to a first power when the running average exceeds a first threshold and to a second power level when the running average exceeds a second threshold, where the second power level is based on a physical layer of the packet.

Referring briefly to the lines 308, 310 and the waveforms 312, 314, 316 of FIG. 3 along with FIG. 4, in some examples, the line 310 may represent the first threshold; the line 308 may represent the second threshold; the waveform 312 may represent a signal having a physical layer associated with a management packet; and the waveform 314 may represent a signal having a physical layer associated with a data packet. In response to the waveform 316 exceeding the line 310, the processor 104 sets the transmission power to approximately 10 dBm, as indicated by the peaks of the waveforms 312, 314 having values of approximately 10 dBm. In response to the waveform 316 exceeding the line 308, the processor 104 sets the transmission power to a first power level of 24 dBm for packets associated with a physical layer matching a management packet, as indicated by the waveform 312, and to 10 dBm for packets associated with a physical layer matching a data packet, as indicated by the waveform 314.

Referring to FIG. 4, in some examples, the processor 104 may determine the second power level based on a destination of the packet. For example, in response to the destination of the packet matching an IP address of a LAN, the processor 104 may set the second power level equal to a first value. In response to the destination of the packet matching an IP address of a WAN, the processor 104 may set the second power level equal to a second value.

In other examples, the processor 104 determines the second power level based on an application associated with the packet. For example, in response to the application of the packet matching a first application, the processor 104 may set the second power level equal to a first value. In response to the application of the packet matching a second application, the processor 104 may set the second power level equal to a second value.

In further examples, the processor 104 may update the running average over a second time period. The processor 104 may determine whether the running average, updated over the second time period, is below the second threshold. The processor 104 may set transmission power for a second packet to a third power level based on the determination. For example, in response to the running average of the first time period exceeding the second threshold, the processor 104 may set a counter that indicates the second threshold has been exceeded once and set the second power level based on the physical layer. In response to the running average of the second time period falling below the second threshold, the processor 104 may determine whether the second threshold has been exceeded more than once. In response to the counter indicating that the second threshold has not been exceeded more than once, the processor 104 may set transmission power for a second packet to a third power level. For example, the processor 104 may determine that a physical layer of the second packet matches a data packet. The processor 104 may make a second determination that a destination of the packet matches an IP address associated with a LAN and set the third power level based on the second determination.

Figure 5:
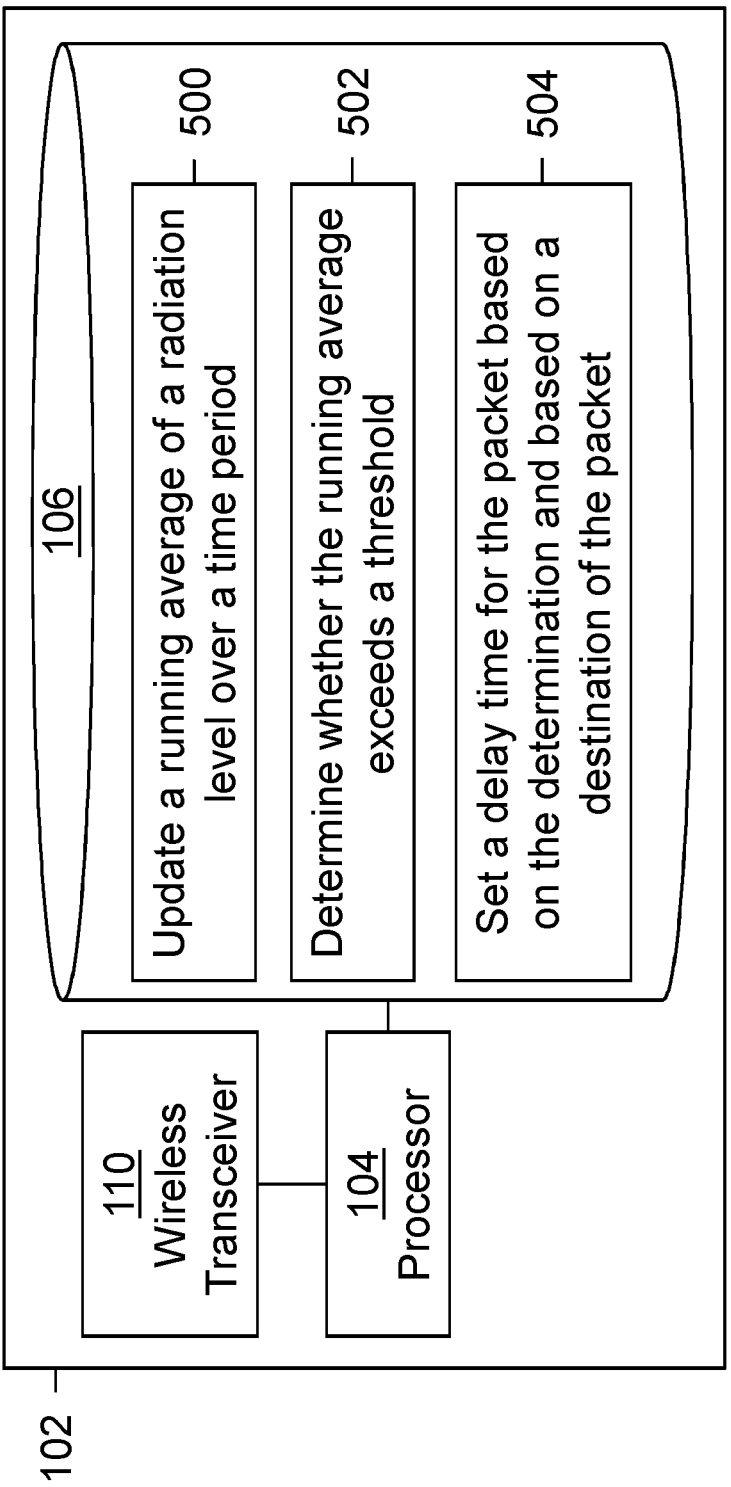
FIG. 5 depicts a schematic diagram of an electronic device for controlling transmission power in accordance with various examples.

Referring now to FIG. 5, a schematic diagram of the electronic device 102 for controlling transmission power is presented, in accordance with various examples. As described above with respect to FIGS. 1, 2, and 4, the electronic device 102 comprises the processor 104 coupled to the wireless transceiver 110 and to the storage device 106. The storage device 106 may store computer-readable instructions 500, 502, and 504. The computer-readable instructions 500, 502, 504 may be the computer-readable instructions 108, for example. As discussed above with respect to FIG. 1, the computer-readable instructions 108, when executed by the processor 104, may cause the processor 104 to perform some or all of the actions attributed herein to the processor 104.

In various examples, when executed by the processor 104, the computer-readable instructions 500, 502, 504 cause the processor 104 to control transmission power. For example, execution of the computer-readable instruction 500 may cause the processor 104 to update a running average of a radiation level over a time period. Execution of the computer-readable instruction 502 may cause the processor 104 to set a delay time for the packet to a first delay time when the running average exceeds a first threshold or to a second delay time when the running average exceeds a second threshold, where the second delay time is based on a physical layer of the packet.

In examples, the processor 104 may determine a physical layer of the packet to determine the second delay time. For example, in response to the processor 104 determining that the physical layer of the packet indicates a management packet, the processor 104 may determine the delay time should equal zero milliseconds (ms) so that the management packet is transmitted immediately. In another example, in response to the processor 104 determining that the physical layer of the packet indicates a data packet, the processor 104 may determine the delay time should equal two ms. By adding or removing delay times, the average transmission power over a time period may be reduced or increased, respectively.

In other examples, the processor 104 may determine a destination of the packet to determine the second delay time. For example, in response to the processor 104 determining that the physical layer of the packet indicates a data packet and a destination of the packet matches an IP address of a LAN, the processor 104 may determine the delay time should equal one ms. In another example, in response to the processor 104 determining that the physical layer of the packet indicates a data packet and a destination of the packet matches an IP address of a WAN, the processor 104 may determine the delay time should equal three ms.

In various examples, the processor 104 may determine the delay time based on the threshold and the priority of the packet. For example, a data structure (not expressly depicted) may comprise priorities and associated delay times. The data structure may be stored on the storage device 106, for example. As discussed above, the priority of the packet may be based on a physical layer specification, an Internet Protocol (IP) layer specification, an application layer specification, a user-defined specification, or some combination thereof. In response to the processor 104 determining a priority of the packet, the processor 104 may cause the wireless transceiver 110 to wait for a delay time before transmitting the packet. The delay time may be based on the delay time associated with the priority in the data structure.

In some examples, priorities may have multiple associated delay times. Each delay time may be associated with a different threshold, for example. For example, a priority may have a first delay time associated with a first threshold, a second delay time associated with a second threshold, a third delay time associated with a third threshold, etc. In response to the processor 104 determining a priority of the packet and determining which threshold has been crossed, the processor 104 may set the delay time based on the associated delay time in the data structure.

In other examples, the processor 104 may update the running average over a second time period. The processor 104 may determine whether the running average, updated over the second time period, is below the second threshold. The processor 104 may set a delay time for a second packet based on the determination. For example, the processor 104 may determine that a physical layer of the second packet indicates a data packet. Based on the determination that the running average is below the second threshold and based on the determination that the physical layer of the second packet indicates a data packet, the processor 104 may set the delay time for the second packet equal to zero ms.

Figure 6:
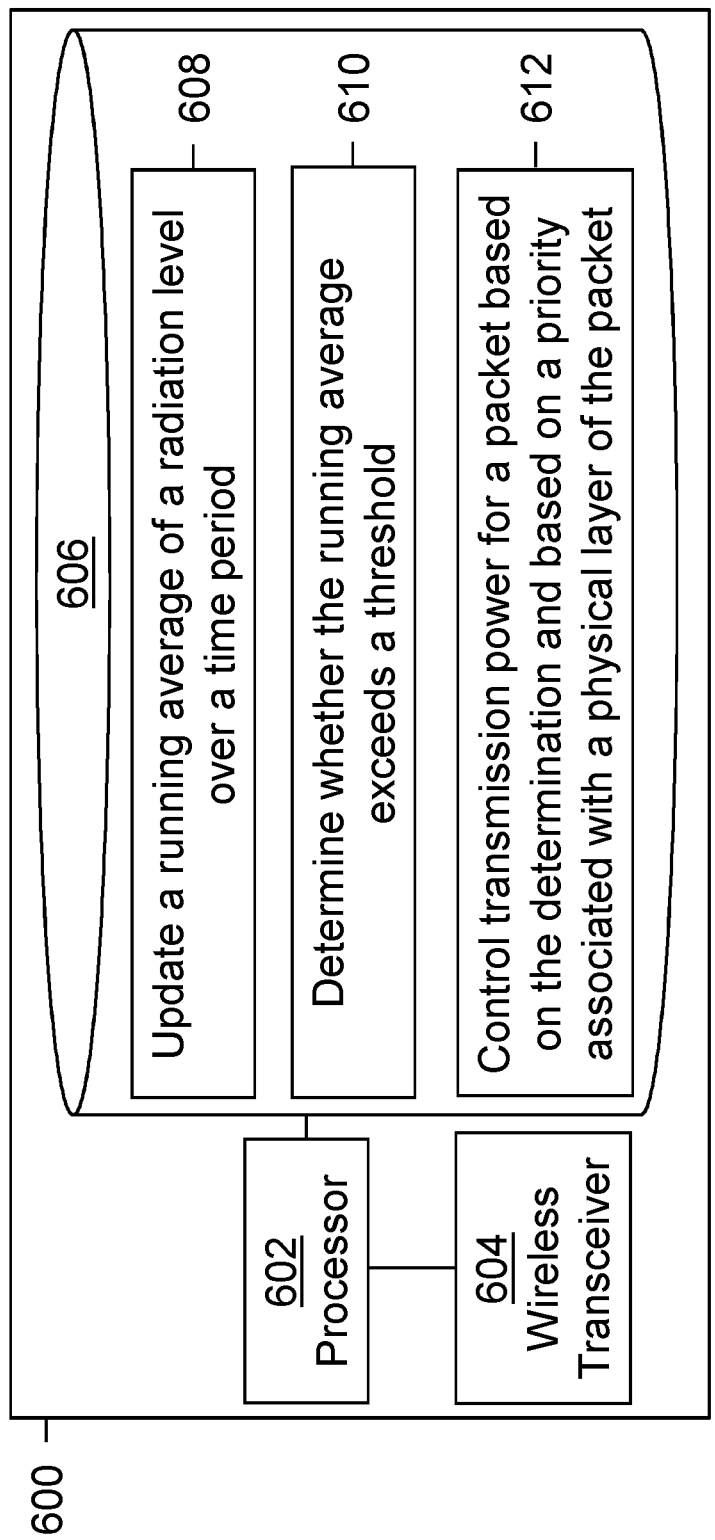
FIG. 6 depicts a schematic diagram of an electronic device for controlling transmission power in accordance with various examples.

Referring now to FIG. 6, a schematic diagram of an electronic device 600 for controlling transmission power is depicted, in accordance with various examples. The electronic device 600 may be the electronic device 102, for example. The electronic device 600 comprises a wireless transceiver 604, a non-transitory computer-readable medium 606, and a processor 602 coupled to the wireless transceiver 604 and the non-transitory computer-readable medium 606. The processor 602 may be a microprocessor, a microcontroller, a microcomputer, or other suitable controller, for example. The non-transitory computer-readable medium 606 may include any electronic, magnetic, optical, or other physical storage device for storing information such as computer-readable instructions and data. The non-transitory computer-readable medium 606 may be the storage device 106, for example. The non-transitory computer-readable medium 606 may store the computer-readable instructions 608, 610, and 612. The computer-readable instructions 608, 610, 612 may be the computer-readable instructions 108, for example. The computer-readable instructions 608, 610, 612 may be for execution by the processor 602.

In various examples, the computer-readable instructions 608, 610, 612 may cause the processor 602 to control transmission power. Execution of the computer-readable instruction 608 may cause the processor 602 to update a running average of a radiation level over a time period, where the running average is based on a quantity of packets transmitted during the time period and on radiation levels associated with the quantity of packets. Execution of the computer-readable instruction 610 may cause the processor 602 to determine whether the running average exceeds a threshold. Execution of the computer-readable instruction 612 may cause the processor 602 to control transmission power for a packet based on the determination and based on a priority associated with a physical layer of the packet.

In various examples, the processor 602 may determine that the priority indicates a data packet. The processor 602 may control transmission power based on the determination and based on an application associated with the packet, as described above with respect to FIGS. 1, 2, 4, and 5.

In other examples, as described above with respect to FIGS. 2, 3, 4 and 5, a computer-readable instruction may cause the processor 602 to update the running average over a second time period. Another computer-readable instruction may cause the processor 602 to make a second determination as to whether the running average, updated over the second time period, exceeds a second threshold. Yet another computer-readable instruction may cause the processor 602 to control transmission power for a second packet based on the second determination.

The processor 602 may determine that the priority indicates a management packet, in yet other examples. The processor 602 may control transmission power based on the determination and based on a destination of the packet, as described above with respect to FIGS. 1, 2, 4, and 5.

Implementing an electronic device for transmission power control as described above eliminates reliance on a proximity sensor to detect a presence of a user, ensures that a wireless connection with a network is maintained so that a user experience is not interrupted by a lost network connection, and may enhance the user experience.

The above description is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the above discussion and in the claims, the term "comprising" is used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. As used herein, including in the claims, the word "or" is used in an inclusive manner. For example, "A or B" means any of the following: "A" alone, "B" alone, or both "A" and "B."

What is claimed is:

1. An electronic device, comprising:
   a wireless transceiver to transmit a packet; and
   a processor coupled to the wireless transceiver, the processor to:
   update a running average of a radiation level over a time period, wherein the running average is based on a quantity of packets transmitted by the wireless transceiver during the time period and based on radiation levels associated with the quantity of packets;
   determine that the running average exceeds a threshold; and
   responsive to determining that the running average exceeds the threshold, control transmission power for the packet based on a destination Internet Protocol (IP) address of the packet.

2. The electronic device of claim 1, wherein the processor is to:
   update the running average over a second time period;
   determine that the running average, updated over the second time period, exceeds a second threshold; and
   responsive to determining that the running average, updated over the second time period, exceeds the second threshold, control transmission power for a second packet.

3. The electronic device of claim 1, wherein the processor is to:
   update the running average over a second time period;
   determine that the running average, updated over the second time period, is below the threshold; and
   responsive to determining that the running average, updated over the second time period, is below the threshold, control transmission power for a second packet.

4. The electronic device of claim 1, wherein the processor is to:
   update the running average over a second time period;
   determine that the running average, updated over the second time period, exceeds the threshold; and
   responsive to determining that the running average, updated over the second time period, exceeds the threshold, control transmission power for a second packet based on a destination IP address of the second packet, the destination IP address of the second packet differing from the destination IP address of the packet.

5. The electronic device of claim 1, wherein the processor is to control transmission power for the packet by reducing a power level, by increasing the power level, by adding a delay time, or by removing a delay time.

6. An electronic device, comprising:
   a wireless transceiver to transmit a first packet at a first time and a second packet at a second time; and
   a processor coupled to the wireless transceiver, the processor to:
   update a running average of a radiation level over a first time period based on a first quantity of packets transmitted during the first time period and based on radiation levels associated with the first quantity of packets;
   set transmission power for the first packet to a first power level responsive to determining that the running average updated over the first time period does not exceed a threshold;
   update the running average of the radiation level over a second time period based on a second quantity of packets transmitted during the second time period and based on radiation levels associated with the second quantity of packets; and
   set transmission power for the second packet to a second power level responsive to determining that the running average updated over the second time period does exceed the threshold, wherein the second power level is set based on a destination of the second packet.

7. The electronic device of claim 6, wherein the second power level is lower than the first power level.

8. The electronic device of claim 7, wherein the destination of the second packet comprises a destination Internet Protocol (IP) address of the second packet.

9. The electronic device of claim 7, wherein the processor is to set the second power level based on an application associated with the second packet.

10. The electronic device of claim 8, wherein the processor is to:
    update the running average of the radiation level over a third time period;
    determine that the running average, updated over the third time period, is exceeds a second threshold; and
    set transmission power for a third packet to a third power level responsive to determining that the running average updated over the third time period exceeds the second threshold, wherein the third power level is lower than the second power level and is set based on a destination IP address of the third packet.

11. A non-transitory computer-readable medium storing computer-readable instructions which, when executed by a processor of an electronic device, cause the processor to:
update a running average of a radiation level over a time period, wherein the running average is based on a quantity of packets transmitted during the time period and based on radiation levels associated with the quantity of packets;
determine that the running average exceeds a threshold; and
responsive to determining that the running average exceeds the threshold, control transmission power for a packet based on a destination Internet Protocol (IP) address associated with the packet.

12. The non-transitory computer-readable medium of claim 11, wherein the computer-readable instructions, when executed by the processor of the electronic device, cause the processor to:
control transmission power for the packet based on a priority associated with the packet.

13. The non-transitory computer-readable medium of claim 11, wherein the computer-readable instructions, when executed by the processor of the electronic device, cause the processor to:
control transmission power for the packet based on an application associated with the packet.

14. The non-transitory computer-readable medium of claim 11, wherein the computer-readable instructions, when executed by the processor of the electronic device, cause the processor to:
update the running average over a second time period;
determine that the running average, updated over the second time period, exceeds a second threshold; and
responsive to determining that the running average, updated over the second time period, exceeds the second threshold, control transmission power for a second packet.

15. The non-transitory computer-readable medium of claim 14, wherein the computer-readable instructions, when executed by the processor of the electronic device, cause the processor to:
responsive to determining that the running average, updated over the second time period, exceeds the second threshold, control transmission power for the second packet based on a destination IP address of the second packet and a priority associated with the second packet.

16. The electronic device of claim 1, wherein, responsive to determining that the running average exceeds the threshold, the processor is to control transmission power for the packet based on whether the destination IP address of the packet is associated with a local area network (LAN) or a wide area network (WAN).

17. The electronic device of claim 16, wherein, responsive to determining that the running average exceeds the threshold, the processor is to:
set the transmission power for the packet to a first power level responsive to determining that the destination IP address of the packet is associated with the LAN; and
set the transmission power for the packet to a second power level responsive to determining that the destination IP address of the packet is associated with the WAN, wherein the second power level is lower than the first power level.

18. The electronic device of claim 8, wherein the second power level is set in response to determining that the destination IP address of the second packet is associated with a wide area network (WAN).

19. The non-transitory computer-readable medium of claim 11, wherein the computer-readable instructions, when executed by the processor of the electronic device, cause the processor to control transmission power for the packet based on whether the destination IP address of the packet is associated with a local area network (LAN) or a wide area network (WAN).

20. The non-transitory computer-readable medium of claim 19, wherein the computer-readable instructions, when executed by the processor of the electronic device, cause the processor to:
set the transmission power for the packet to a first power level responsive to determining that the destination IP address of the packet is associated with the LAN; and
set the transmission power for the packet to a second power level responsive to determining that the destination IP address of the packet is associated with the WAN, wherein the second power level is lower than the first power level.

* * * * *